United States Patent
King et al.

(10) Patent No.: US 8,274,382 B2
(45) Date of Patent: *Sep. 25, 2012

(54) COMPASS BASED CAR LOCATOR

(75) Inventors: Ronald O. King, Brownstown, MI (US); Riad Ghabra, Dearborn Heights, MI (US); John Nantz, Brighton, MI (US); Yi Luo, Superior Township, MI (US)

(73) Assignee: Lear Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/027,471

(22) Filed: Feb. 15, 2011

(65) Prior Publication Data

US 2011/0133962 A1 Jun. 9, 2011

Related U.S. Application Data

(63) Continuation of application No. 12/044,863, filed on Mar. 7, 2008, now Pat. No. 7,911,337.

(51) Int. Cl.
*G08B 1/08* (2006.01)
(52) U.S. Cl. ......... 340/539.21; 340/426.22; 340/539.11; 340/539.13; 340/988; 340/989; 701/200; 701/213
(58) Field of Classification Search ............. 340/539.21, 340/988, 989, 539.13, 426.22, 539.11, 933, 340/932.2; 701/200, 213, 207, 208, 302; 342/357.07, 457; 33/352
See application file for complete search history.

(56) References Cited

U.S. PATENT DOCUMENTS

| | | | |
|---|---|---|---|
| 6,363,324 B1 | 3/2002 | Hildebrant | |
| 6,405,125 B1 | 6/2002 | Ayed | |
| 6,529,142 B2 | 3/2003 | Yeh et al. | |
| 7,148,802 B2 | 12/2006 | Abbruscato | |
| 7,242,321 B2 | 7/2007 | New et al. | |
| 7,911,337 B2 * | 3/2011 | King et al. | 340/539.21 |
| 2003/0139878 A1 | 7/2003 | DeLuca et al. | |
| 2006/0042107 A1 | 3/2006 | Ligai | |
| 2006/0149684 A1 | 7/2006 | Matsuura et al. | |
| 2009/0091477 A1 * | 4/2009 | McCall et al. | 340/990 |

FOREIGN PATENT DOCUMENTS

| | | |
|---|---|---|
| CN | 201032488 Y | 3/2008 |
| DE | 10046571 A1 | 5/2002 |
| DE | 10235132 A1 | 2/2004 |
| DE | 102004050292 A1 | 4/2006 |
| DE | 102005003452 A1 | 7/2006 |
| DE | 60027742 T2 | 11/2006 |

OTHER PUBLICATIONS

German Office Action for corresponding Application No. 10 2009 006 796.5, mailed Jul. 13, 2010, 8 pages.
Chinese Office Action for corresponding Application No. 2009100087485, mailed May 12, 2011, 9 pages.

* cited by examiner

*Primary Examiner* — Brent Swarthout
(74) *Attorney, Agent, or Firm* — Brooks Kushman P.C.

(57) ABSTRACT

A remote keyless entry system is provided comprising a handheld remote keyless entry transmitter in selectable wireless communication with a car based entry system. The handheld remote keyless entry transmitter comprises an integrated electronic compass element and logic adapted to store a first compass direction when activated and directed towards a destination. The logic further is adapted to display a return compass direction and a return distance from the car based entry system when activated leaving the destination.

20 Claims, 2 Drawing Sheets

COMPASS BASED CAR LOCATOR

CROSS-REFERENCE TO RELATED APPLICATIONS

This application is a continuation of U.S. application Ser. No. 12/044,863 filed Mar. 7, 2008, now U.S. Pat. No. 7,911,337, the disclosure of which is incorporated in its entirety by reference herein.

TECHNICAL FIELD

The present invention relates generally to a system and assembly for locating a parked vehicle, and more particularly concerns a compass based location system with distance display.

BACKGROUND

Vehicle location technology has made significant advances. Customers routinely rely on global positioning systems (GPS) for in-car navigation and increasingly for finding locations of destinations. Despite the increased use of GPS technologies, it cannot address all of the vehicle location needs. One such need wherein GPS technology falls short is the locating of a parked vehicle from a remote location.

Virtually every car user has encountered this dilemma. At a mall, an airport parking lot, a concert, or even work, when a driver attempts to return to the vehicle the precise location cannot be remembered. Handheld GPS devices would provide an incredibly accurate and convenient methodology for locating the parked vehicle. At present, however, GPS technologies have drawbacks that render them undesirable especially to integration into portable key-fobs. GPS technology is often very expensive and as such may not be considered cost effective. Furthermore, present GPS designs often require a significant amount of PCB space which results in an oversized transmitter. In addition, GPS technologies require significant current which prevent their integration into standard key-fobs.

It would be advantageous to have a cost effective and simple vehicle location device that could be integrated into existing remote keyless entry systems. It would be further advantageous for such a system to be small, cost effective, and capable of sharing a key-fob with a remote keyless entry transmitter.

SUMMARY

A remote keyless entry system is provided comprising a handheld remote keyless entry transmitter in selectable wireless communication with a car based entry system. The handheld remote keyless entry transmitter comprises an integrated electronic compass element and logic adapted to store a first compass direction when activated and directed towards a destination. The logic further is adapted to display a return compass direction and a return distance from the car based entry system when activated leaving the destination.

The present invention itself, together with further intended advantages, will be best understood by reference to the following detailed description and taken in conjunction with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the following description, various operating parameters and components are described for one or more constructed embodiments. These specific parameters and components are included as examples and are not meant to be limiting.

Figure 1:
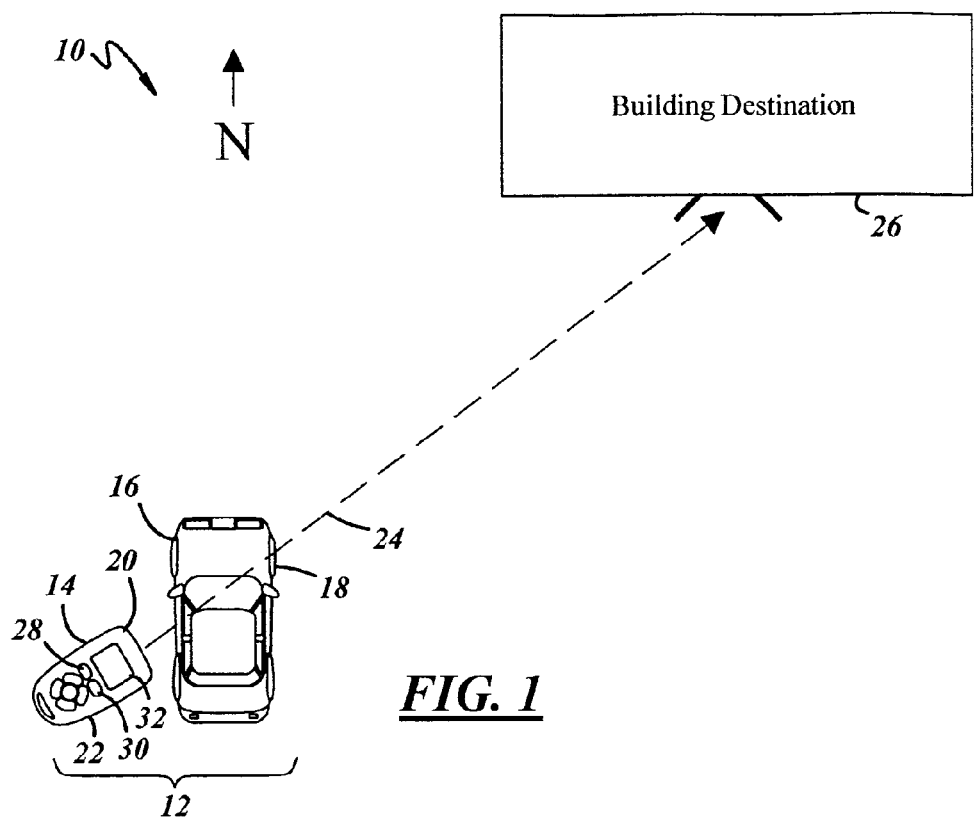
FIG. 1 shows a vehicle location system in accordance with the present invention, the system illustrated setting a first compass direction.
Figure 2:
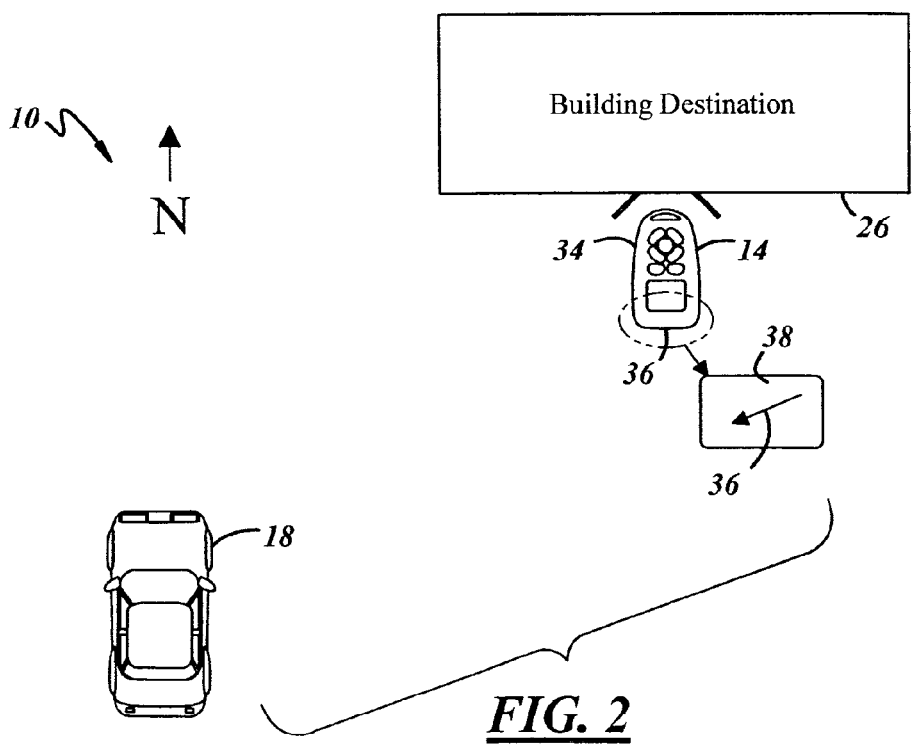
FIG. 2 shows the vehicle location system illustrated in FIG. 1, the system illustrated displaying the return direction and return distance to the vehicle.

Referring now to FIGS. 1 and 2, which is a vehicle location system 10 in accordance with the present invention. Although it is contemplated that the vehicle location system 10 may be an independent stand alone system, it is preferable that the vehicle location system 10 be incorporated into an existing vehicle system such as a remote keyless entry system 12.

The vehicle location system 10 includes a handheld remote 14 (handheld remote keyless entry transmitter) in selective wireless communication with a signal generating car based system 16 (car based entry system). These systems are well known in the art and by consumers to remotely lock and unlock their vehicle 18. The present invention differs from existing remote keyless entry systems 12 by integrating a compass element 20 into the handheld remote keyless entry transmitter 14. It is contemplated that this compass element 20 comprise an electronic compass element and is preferably self leveling such that it provides an accurate directional reading over a variety of angles of the transmitter 14. It is further preferable that the compass element 20 be driven by the same power source 22 (battery) as the remote keyless entry transmitter 14.

The handheld remote keyless entry transmitter 14 further comprises logic adapted to store a first compass direction 24 when activated and directed towards a destination 26. This may be accomplished by a user pressing a dedicated directional lock button 28 or may simply be done automatically upon a user pressing the vehicle lock button 30. In either case, the first compass direction 24 is stored within the logic and may be displayed accordingly on a display screen 32. The user is then free to proceed to the destination and enter thereto.

At some point the user will desire to leave the destination 26 and proceed back to the vehicle 18. If significant time has passed, the user may not recall the location of the vehicle 18 which may well be out of eye shot. As such the user may activate the handheld remote keyless entry transmitter 14 upon leaving the destination 26, preferably by way of pressing a return to vehicle button 34. The logic is then further adapted to calculate and display a return compass direction 36 and a return distance 38 to the vehicle 18 to help guide the user back to the vehicle 18. It is contemplated that the return distance 38 may be calculated in a variety of fashions. In one embodiment, it is contemplated that the return distance 38 is determined using the signal strength of the car based entry system 16. In another embodiment to be further redressed below, it is contemplated that a pedometer count, travel time, or other methodology be utilized to estimate the distance between the vehicle 18 and the destination 26. By providing both direction and distance, the present invention provides the user with a quick, inexpensive, and portable estimation of the vehicle 18 location when leaving a destination 26.

Figure 3:
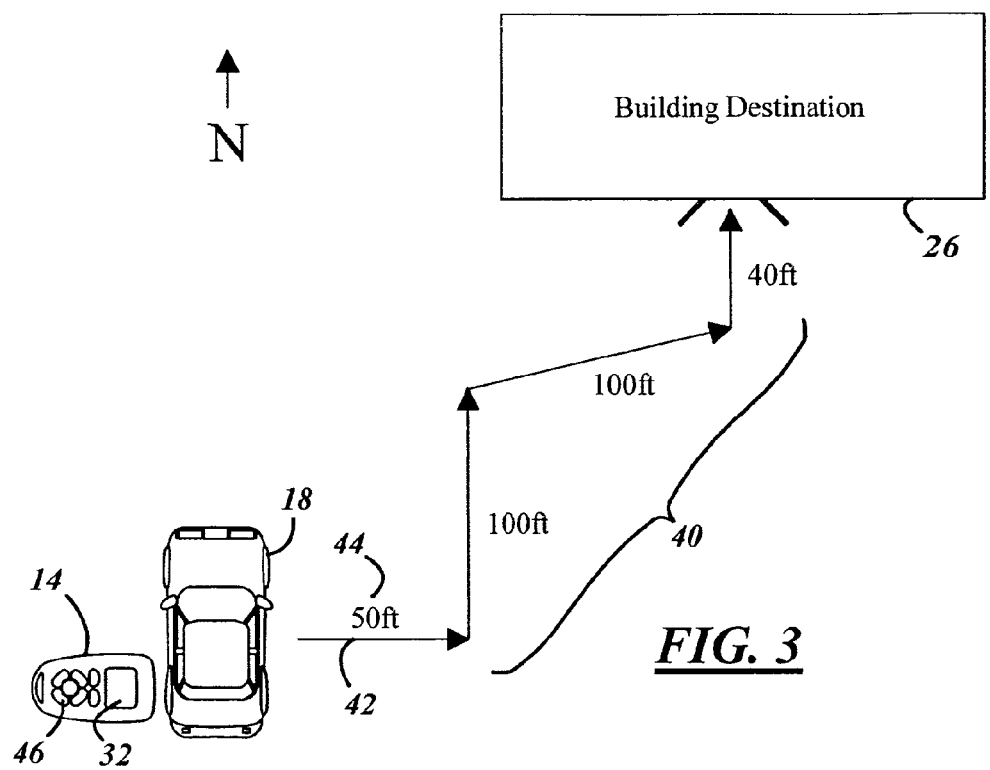
FIG. 3 shows an alternate embodiment of the vehicle location system illustrated in FIG. 1, the system illustrated storing a plurality of journey segments.
Figure 4:
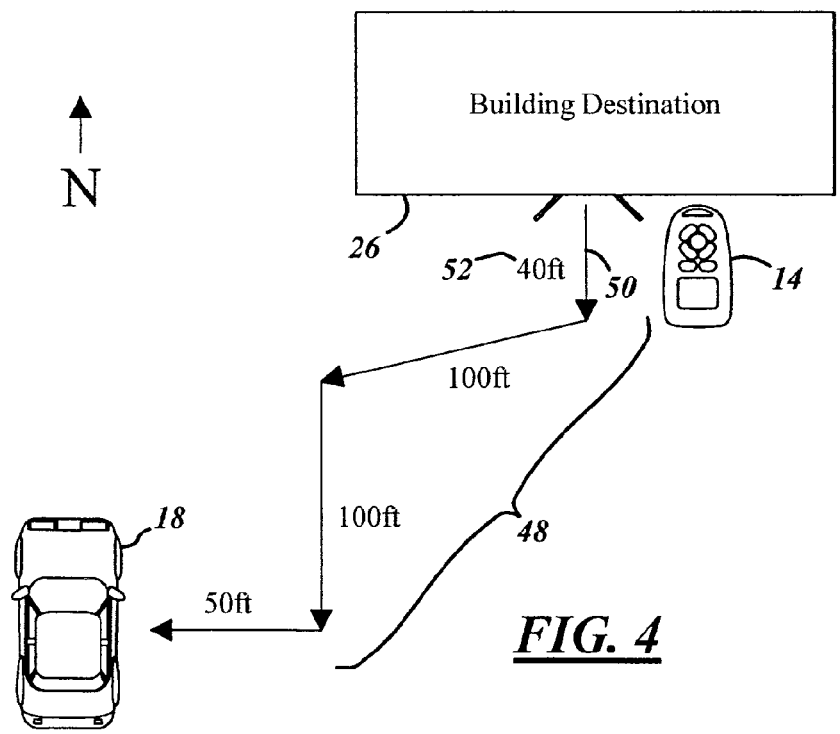
FIG. 4 shows the vehicle location system illustrated in FIG. 3, the system illustrated showing a segmented return trip information.

It should be understood, that the aforementioned vehicle location system 10 as described is described at its most basic, wherein the user can reasonably point the handheld remote keyless entry transmitter 14 at an identifiable destination 26. There may be scenarios, however, where the user's path to the destination 26 is convoluted and the destination 26 may not be immediately visible from the vehicle 18 (see FIGS. 3 and 4). The present invention, therefore, further contemplates that the logic may be further adapted to store a plurality of journey segments 40 rather than simply a single destination. This is accomplished by storing for each of the plurality of journal segments 40 a step compass direction 42 and a step distance 44 from the vehicle 18 or the car based entry system 16. This may be accomplished by the user pressing the directional lock button 28 and the end of each directional segment 40 or by the logic recognizing a significant alteration or directional travel and automatically instituting a segment change. The logic may alternatively use a timed polling to define the segments. Similarly, distance may again be gauged by signal strength from the car based entry system 16, by pedometer count, or by any other method.

It is contemplated that the user may press a final destination button 46 at the end of the journey segments 40 or that the logic may continuously map directions and distances. In either case, the logic is adapted to calculate and display a return trip 48 comprising a plurality of step return compass directions 50 and step return distances 52. These may be displayed sequentially as the user returns to the vehicle 18 or may be displayed all at once such that the user can map his return path differently. Finally, it is contemplated that the logic may be further adapted to continuously monitor the user's return to the vehicle 18 such that distance and direction may be continually adjusted if alternate paths are utilized.

While the invention has been described in connection with one or more embodiments, it should be understood that the invention is not limited to those embodiments. On the contrary, the invention covers all alternatives, modifications, and equivalents as may be included within the spirit and scope of the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A remote keyless entry (RKE) transmitter operable to wirelessly communicate with an RKE system of a vehicle, the RKE transmitter comprising:

logic operable to indicate a return trip having a plurality of return compass directions and return distances to a user, the return compass directions and return distances being sufficient to direct the user from a destination back to the vehicle;

wherein the logic is operable to determine at least most of the return compass directions and return distances as the user journeys from the vehicle to the destination;

a directional lock button; and wherein the logic is operable to define a plurality of journey segments to direct the user from the destination back to the vehicle, each one of the journey segments being determined to correspond with the user separately actuating the directional lock button for each journey segments, each journey segment defining one return compass direction and one return distance to represent a travel distance and direction for the user to travel for the corresponding journey.

2. The RKE transmitter of claim 1 further comprising an electronic compass element operable to facilitate determination of the return compass directions based on compass directions generated by the electronic compass element while the user journeys from the vehicle to the destination.

3. The RKE transmitter of claim 1 further comprising an electronic signal strength element operable to facilitate determination of the return distances based on signal strengths measured between the RKE transmitter and the vehicle while the user journeys from the vehicle to the destination.

4. The RKE transmitter of claim 1 further comprising an electronic pedometer count element operable to facilitate determination of the return distances based on steps taken by the user while the user journeys from the vehicle to the destination.

5. The RKE transmitter of claim 1 further comprising further comprising:

an electronic compass element; and wherein each one of the plurality of journey segments are determined when the electronic compass element detects a significant alteration in the user's direction of travel proximate in time to user actuation of the directional lock button.

6. The RKE transmitter of claim 5 further comprising an electronic signal strength element operable to facilitate determination of the return distances based on signal strengths measured between the RKE transmitter and the vehicle.

7. The RKE transmitter of claim 1 further comprising:

an electronic compass element operable to facilitate determination of the return compass directions based on compass directions generated by the electronic compass element while the user journeys from the vehicle to the destination; and an electronic signal strength element operable to facilitate determination of the return distances based on signal strengths measured between the RKE transmitter and the vehicle while the user journeys from the vehicle to the destination.

8. The RKE transmitter of claim 1 further comprising:

a display; and wherein the logic is operable to facilitate display of the return trip as a sequence of journey segments, each journey segment displaying at least one return compass direction and one return distance.

9. The RKE transmitter of claim 8 wherein the logic is operable to facilitate display of the journey segments without reliance on wireless communications.

10. The RKE transmitter of claim 1 further comprising the logic operable to update the return trip to an updated return trip, the updated return trip including at least one updated return compass direction and updated return distance in order to direct the user from the destination back to the vehicle in the event the user deviates from the return trip while returning to the vehicle from the destination.

11. The RKE transmitter of claim 1 further comprising the logic determining the return trip without relying on global positioning system (GPS) based communications conducted while the user travels from the destination to the vehicle.

12. The RKE transmitter of claim 1 further comprising the logic determining the return trip without relying on global positioning system (GPS) based communications conducted while the user travels from the vehicle to the destination.

13. A vehicle finder transmitter comprising:
   logic operable to indicate a return trip as a plurality of journey segments sufficient to direct a user from a destination back to the vehicle, each journey segment defining one return compass direction and one return distance;
   an electronic compass element operable to facilitate determination of the return compass directions based on compass directions generated by the electronic compass element;
   an electronic signal strength element operable to facilitate determination of the return distances based on signal strengths measured between the transmitter and the vehicle; and
   wherein substantially all of the return compass directions and return distances are determined prior to the user reaching the destination;
   a directional lock button; and
   wherein the logic is operable to divide the return trip into each one of the plurality of journey segments according to user actuation of the directional lock button.

14. The transmitter of claim 13 wherein each one of the plurality of journey segments being automatically determined when the electronic compass element detects a significant alteration in the user's direction of travel from the vehicle to the destination.

15. A computer-readable program operable to facilitate control of a remote keyless entry (RKE) transmitter operable with a RKE system of a vehicle to indicate a plurality of journey segments, the plurality of journey segments being sufficient to direct a user from a destination back to the vehicle after the user has previously traveled from the vehicle to the destination, each journey segment defining a corresponding compass direction and distance to be traveled by the user for that journey segment, the program comprising logic operable to:
   determine substantially all of the compass directions and distances for substantially all of the journey segments while the user travels from the vehicle to the destination;
   determine a beginning and an ending of each of the plurality of journey segments from corresponding user actuation of a button included on the RKE transmitter while the user travels from the vehicle to the destination, thereby requiring the user to actuate the button at least three times while traveling from the vehicle to the destination.

16. The computer-readable program of claim 15 wherein the logic is further operable to determine distances for each of the plurality of journey segments solely from wireless communications between the RKE transmitter and the RKE system.

17. The computer-readable program of claim 15 wherein the logic is further operable determine the plurality of journey segments without relying on global positioning system (GPS) based communications conducted while the user travels from the destination to the vehicle.

18. The computer-readable program of claim 15 wherein the logic is further operable determine the plurality of journey segments without relying on global positioning system (GPS) based communications conducted while the user travels from the vehicle to the destination.

19. The RKE transmitter of claim 1 wherein the plurality of return of journey segments comprises at least three journey segments, thereby requiring the user to actuate the directional lock button at least three times.

20. The transmitter of claim 13 wherein the plurality of return of journey segments comprises at least three journey segments, thereby requiring the user to actuate the directional lock button at least three times.

* * * * *